United States Patent Office 2,703,333
Patented Mar. 1, 1955

2,703,333

3-METHYL-3-HYDROXY-2-BUTANIL AND METHOD FOR PREPARING SAME

Daniel C. Rowlands, Worthington, Ohio, assignor, by mesne assignments, to Air Reduction Company, Incorporated, New York, N. Y., a corporation of New York No Drawing. Application April 21, 1954,
Serial No. 424,750

2 Claims. (Cl. 260—566)

This invention relates to a novel chemical compound and to a process for preparing same.

More particularly, the invention is concerned with the new substance 3-methyl-3-hydroxy-2-butanil which can be represented by the formula:

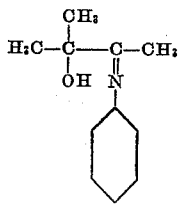

This new anil of methyl butynol may be useful as a local anesthetic or analgesic and is useful as an intermediate in the preparation of insecticides and other useful organic compounds.

This novel compound can be obtained by reacting aniline with 3-methyl-1-butyn-3-ol in the presence of a catalyst mixture comprising mercuric oxide and boron trifluoride-etherate. Reaction temperatures of 50° to 80° C. are satisfactory; however, temperatures of from 60° to 65° C. are preferred.

The invention is further disclosed in the following example, which is illustrative, but not limitative thereof.

Example

Water-white, freshly distilled aniline (88.0 g., 0.95 mole) was stirred in a flask and red mercuric oxide (15 g.) and boron trifluoride-etherate (6 g.) were added. The mixture was warmed to 50° C. and 3-methyl-1-butyn-3-ol (42.0 g., 0.5 mole) was added dropwise to the rapidly stirred mixture. The resulting reaction was quite exothermic and the temperature rose rapidly to 77° C. The reaction mixture was cooled to 60° C., and the remainder of the addition was carried out at 60° to 65° C. over a period of one-half hour. The mixture was then stirred for one hour and heated between 50° and 60° C. It was then cooled, agitated with an excess of anhydrous potassium carbonate for fifteen minutes, filtered and distilled into the following cuts: headings (48.0 g.; B. P., gaseous—103° C./4 mm.), good 3-methyl-3-hydroxy-2-butanil (56.6 g., 64 per cent yield; B. P. 103–105° C./4 mm.), and residues (10.0 g.; B. P.>105° C./4 mm.).

What is claimed is:
1. The compound 3-methyl-3-hydroxy-2-butanil.
2. A process for preparing the novel compound 3-methyl-3-hydroxy-2-butanil which comprises reacting aniline with 3-methyl-1-butyn-3-ol in the presence of a catalyst mixture comprising mercuric oxide and boron trifluoride-etherate.

No references cited.